United States Patent [19]
Wu et al.

[11] Patent Number: 5,694,233
[45] Date of Patent: Dec. 2, 1997

[54] SWITCHABLE WAVELENGTH ROUTER

[75] Inventors: Kuang-Yi Wu; Jian-Yu Liu, both of Boulder, Colo.

[73] Assignee: Macro-Vision Communications, LLC, Boulder, Colo.

[21] Appl. No.: 780,291

[22] Filed: Jan. 8, 1997

Related U.S. Application Data

[63] Continuation-in-part of Ser. No. 685,150, Jul. 23, 1996, and Ser. No. 739,424, Oct. 29, 1996.
[51] Int. Cl.$^6$ .................... H04J 14/00; H04B 10/00
[52] U.S. Cl. .................. 359/117; 359/127; 359/156; 359/251
[58] Field of Search .................... 359/115, 117, 359/127, 128, 245, 246, 247, 251, 39, 156

[56] References Cited

U.S. PATENT DOCUMENTS

| | | | |
|---|---|---|---|
| 4,650,289 | 3/1987 | Kuwahara | 350/375 |
| 4,720,171 | 1/1988 | Baker | 350/331 |
| 4,919,522 | 4/1990 | Nelson | 359/246 |
| 4,989,941 | 2/1991 | Soref | 350/96.18 |
| 5,013,140 | 5/1991 | Healey et al. | 350/347 |
| 5,162,944 | 11/1992 | Yamamoto et al. | 359/247 |
| 5,165,104 | 11/1992 | Weverka | 385/7 |
| 5,317,658 | 5/1994 | Bergland et al. | 385/16 |
| 5,363,228 | 11/1994 | DeJule et al. | 359/117 |
| 5,381,250 | 1/1995 | Meadows | 359/39 |
| 5,414,541 | 5/1995 | Patel et al. | 359/39 |

OTHER PUBLICATIONS

"Synthesis of Electro–Optic Shutters having a Prescribed Transmission vs. Voltage Characteristic", by E.O. Ammann, *Journal of the Optical Society of America*, vol. 56, No. 8, pp. 1081–1088 (Aug. 1966).

"Optical Network Synthesis Using Birefringent Crystals. *I. Synthesis of Lossless Networks of Equal–Length Crystals", by S.E. Harris et al., *Journal of the Optical Society of America*, vol. 54, No. 10, pp. 1267–1279 (Oct. 1964).

*Primary Examiner*—Rafael Bacares
*Attorney, Agent, or Firm*—Dorr, Carson, Sloan & Birney, P.C.

[57] ABSTRACT

A switchable wavelength router has a first birefringent element that decomposes and spatially separates an incoming WDM optical signal into two orthogonally-polarized beams. A first polarization rotator selectably rotates the polarization of one of the beams to match the polarization of other beam, based on an external control signal. A wavelength filter (e.g., stacked waveplates) provides a polarization-dependent optical transmission function such that the first beam decomposes into third and fourth orthogonal beams, and the second beam decomposes into fifth and sixth orthogonal beams. The third and fifth beams carry a first spectral band at a first polarization and the fourth and sixth beams carry a second spectral band at an orthogonal polarization. A second birefringent element spatially separates these four beams into four horizontally polarized and vertically polarized components. A second polarization rotator rotates the polarizations of the beams so that the third and fifth beams, and the fourth and sixth beams are orthogonally polarized. A third birefringent element recombines the third and fifth beams (i.e., the first spectral band), and also recombines the fourth and sixth beams (i.e., the second spectral band) which are coupled to the two output ports based on the control state of the wavelength router.

19 Claims, 8 Drawing Sheets

SWITCHABLE WAVELENGTH ROUTER

RELATED APPLICATION

The present application is a continuation-in-part of the Applicants' co-pending U.S. patent application Ser. No. 08/685,150, entitled "Fault-Tolerant Optical Routing Switch", filed on Jul. 23, 1996. The present application is also a continuation-in-part of the Applicants' co-pending U.S. patent application Ser. No. 08/739,424, entitled "Programmable Wavelength Router", filed on Oct. 29, 1996.

BACKGROUND OF THE INVENTION

1. Field of the Invention

The present invention relates, in general, to communication systems, and more particularly, to a switchable wavelength router for wavelength division multiplex (WDM) optical communications.

2. Statement of the Problem

Optical wavelength division multiplexing has gradually become the standard backbone network for fiber optic communication systems. WDM systems employ signals consisting of a number of different wavelength optical signals, known as carrier signals or channels, to transmit information on optical fibers. Each carrier signal is modulated by one or more information signals. As a result, a significant number of information signals may be transmitted over a single optical fiber using WDM technology.

Despite the substantially higher fiber bandwidth utilization provided by WDM technology, a number of serious problems must be overcome, for example, multiplexing, demultiplexing, and routing optical signals, if these systems are to become commercially viable. The addition of the wavelength domain increases the complexity for network management because processing now involves both filtering and routing. Multiplexing involves the process of combining multiple channels (each defined by its own frequency spectrum) into a single WDM signal. Demultiplexing is the opposite process in which a single WDM signal is decomposed into individual channels. The individual channels are spatially separated and coupled to specific output ports. Routing differs from demultiplexing in that a router spatially separates the input optical channels into output ports and permutes these channels according to control signals to a desired coupling between an input channel and an output port.

The Applicants' co-pending U.S. patent application Ser. Nos. 08/685,150 and 08/739,424 (Kuang-Yi Wu et al.) teach two independent methods for high performance signal routing (Ser. No. 08/685,150) and wavelength de-multiplexing (Ser. No. 08/739,424). In Ser. No. 08/685,150, new structures for realizing optical switches (routers) are disclosed that achieve very high extinction ratio operation. However, these switches are wavelength independent. In Ser. No. 08/739,424, a system is disclosed to provide the functions of wavelength de-multiplexing and routing. However, this single stage design relies primarily on the filter design. The transmission function of the filter has to be close to an ideal square flat-top to realize the desired low crosstalk operation.

In this patent application, we combine the two architectures and concepts presented in the above-cited patent applications to create a switchable wavelength router. This new structure employs double stage filters that can obtain a better (purified) pass-band transmission, and incorporates a fault-tolerant structure (similar to that disclosed in Ser. No. 08/685,150) that results in low crosstalk between channels.

3. SUMMARY OF THE INVENTION

The present invention involves a switchable wavelength router having an input port for the incoming WDM signal and a two output ports for de-multiplexing the WDM signals. The router divides the received optical signals into divided optical signals comprising a subset of the channels and spatially positions the divided optical signals in response to a control signal applied to the router. For example, the router can divide a received WDM signal into two subsets that are either single channel or WDM signals. Multiple routers can be cascaded to form a $2^n$ switchable wavelength router, where n is the number of stages of wavelength routers.

BRIEF DESCRIPTION OF THE DRAWINGS

In FIG. 4a, spectra of the output port #1 are recorded before and after switching. FIG. 4b shows the corresponding spectra of the output port #2 before and after switching. The spectra are roughly equally separated and are ready for further spectral slicing.

DETAILED DESCRIPTION OF THE INVENTION

1. Overview

Figure 1A:
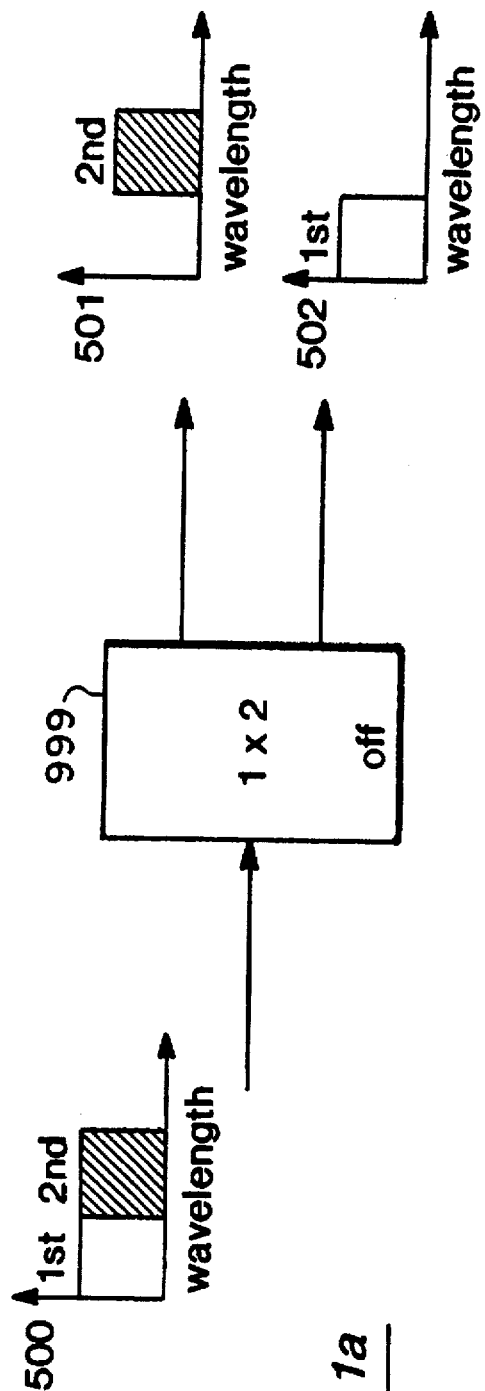
FIGS. 1a and 1b are block diagrams illustrating the functionality of the optical router in accordance with the present invention.
Figure 1B:
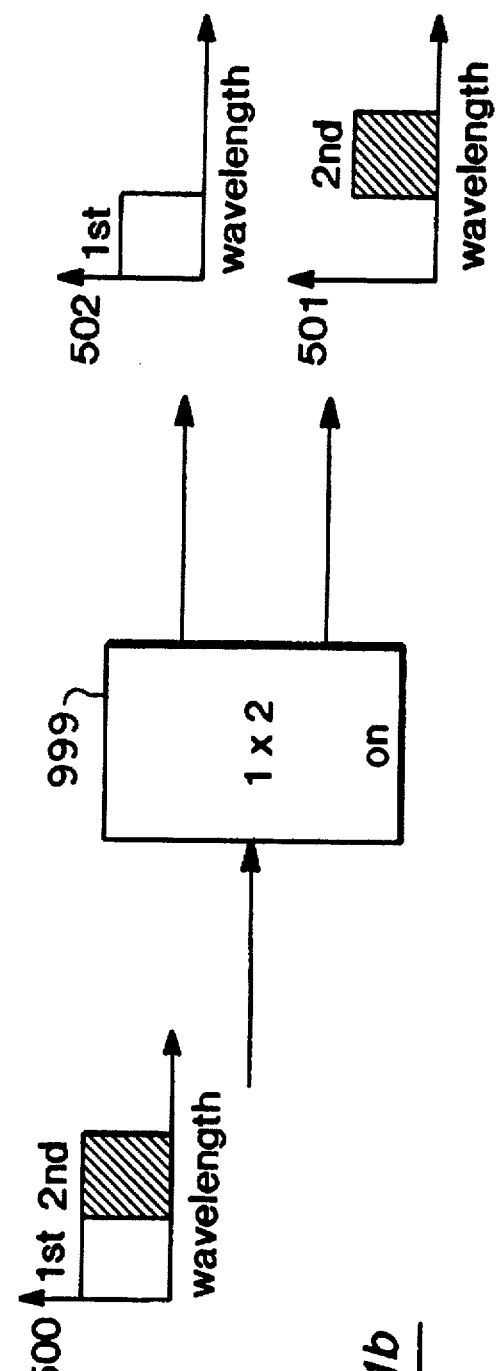

The present invention both demultiplexes (i.e., spectrally separates) and routes (i.e., spatially permutates) a wavelength division multiplexed (WDM) optical signal. FIGS. 1a and 1b are block diagrams illustrating the general functionality of the present invention. A WDM signal 500 consists of multiple channels, with each channel having its own range of wavelengths or frequencies. As used herein, the terms "channel" or "spectral band" refer to a particular range of frequencies or wavelengths that define a unique information signal. Each channel is usually evenly spaced from adjacent channels, although this is not necessary. Uneven spacing may result in some complexity in design, but, as will be seen, the present invention can be adapted to such a channel system. This flexibility is important in that the channel placement is driven largely by the technical capabilities of transmitters (i.e., laser diodes) and detectors and so flexibility is of significant importance.

The WDM signal 500 is input using conventional optical signal coupling techniques to the input port of the switchable wavelength router 999. By switching the control signal between two control states (e.g., on and off), the router 999 generates two unique output signals at its output ports, where the input WDM spectrum is split into two bands 501 and 502. One is denoted as the first band 501 (i.e., the shorter wavelength in FIG. 1a) and the other is denoted as the second band 502 (i.e., the longer wavelength in FIG. 1a). The two spectral bands are routed to the output ports according to the control state, as depicted in FIGS. 1a and 1b. The two output spectra can be symmetric or asymmetric depending on the functionality required by the WDM system. For optical channel demultiplexing, symmetric spectra at the two output ports are usually preferred. In addition, a second stage wavelength router with a narrower spectral response can be cascaded after the outputs of the first stage to further splice the spectra and produce even narrower spectral bandwidths. In an asymmetric spectra design, the wavelength router can be used as an add/drop filter for a WDM network node. Here, a specific optical channel can be added or dropped through the narrower band of the asymmetric spectra of the wavelength router, while the rest of the channels continue past the wavelength router through the wider complementary spectrum. This allows WDM signals enter or leave the network as they travel within the WDM network.

2. Double Stage Router

Figure 2A:
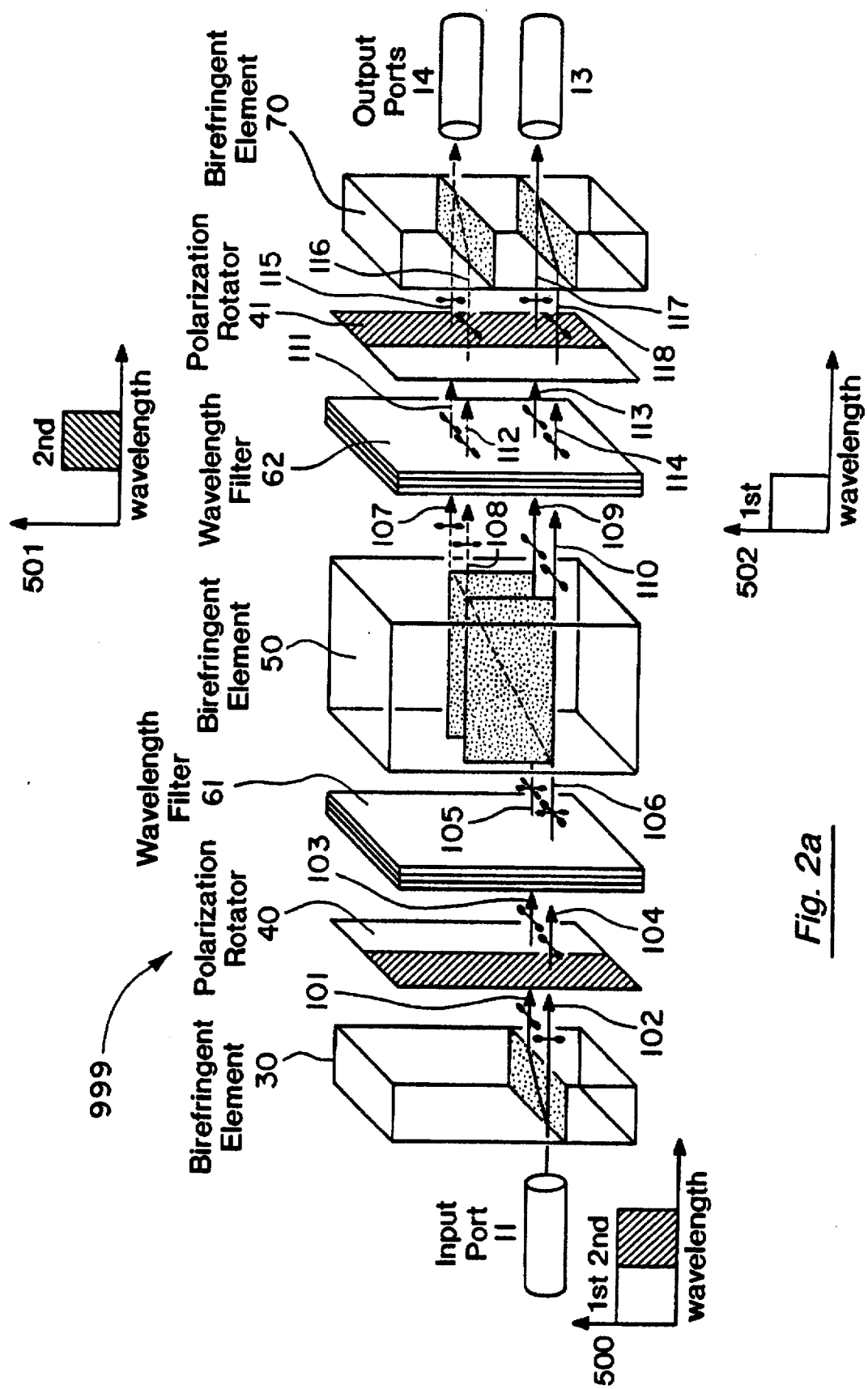
FIGS. 2a and 2b are simplified schematic diagrams illustrating a double stage switchable wavelength router in accordance with the present invention.
Figure 2B:
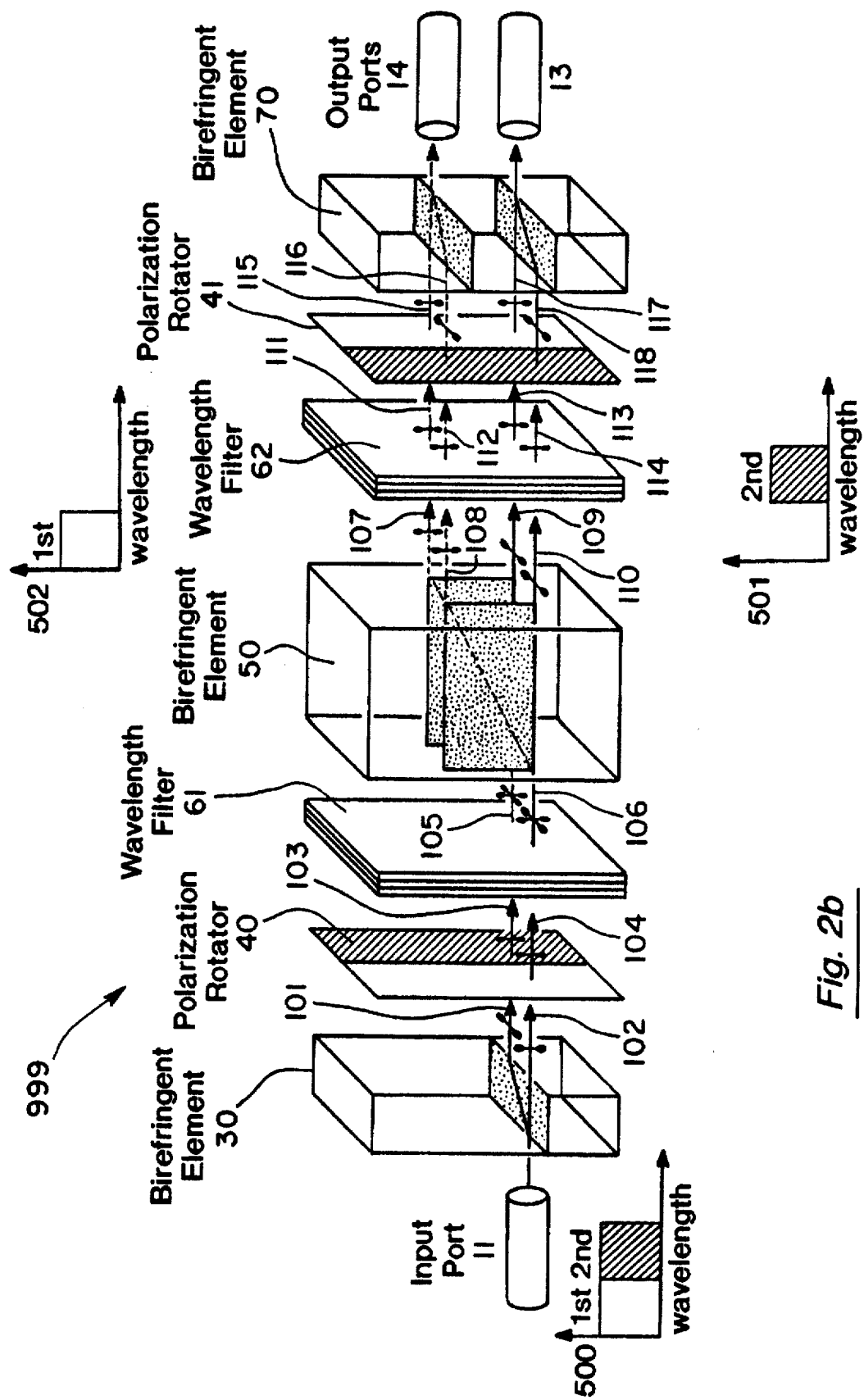

FIG. 2a and FIG. 2b are schematic diagrams illustrating the two control states of a double-stage wavelength router 999. The wavelength router 999 is under binary control from a control bit and hence has two control states. The router 999 serves to separate channels of the wavelength spectrum applied to an input port 11 and determines which of two output ports 13, 14 are coupled to each of the channels.

In FIG. 2a and FIG. 2b, the bold solid lines indicate optical paths that contain the full spectrum of channels in the WDM input signal 500. Solid thin lines indicate optical paths of signals containing a first subset of channels labeled as the first spectral band. Thin dashed lines indicate the optical channels carrying a second subset of channels referred to as the second spectral band. It is important to understand that each of the subsets may comprise more than one channel and may itself be a WDM signal although having a smaller bandwidth than the original WDM signal 500. Each of the optical paths is further labeled with either a horizontal double-headed line indicating horizontal polarization, or a vertical double-headed line indicating vertical polarization, or both horizontal and vertical double-headed lines indicating mixed horizontal and vertical polarizations in the optical signal at that point.

The WDM signal 500 enters the first birefringent element 30 that spatially separates horizontal and vertically polarized components of the WDM signal 500. The first birefringent element 30 consists of a material that allows the vertically polarized portion of the optical signal to pass through without changing course because they are ordinary waves in the birefringent element 30. In contrast, horizontally polarized waves are redirected at an angle because of the birefringent walk-off effect. The angle of redirection is a well-known function of the particular materials chosen. Examples of materials suitable for construction of the birefringent element include calcite, rutile, lithium niobate, $YVO_4$ based crystals, and the like. The horizontally polarized component travels along a path 101 as an extraordinary signal in the first birefringent element 30 while the vertically polarized component 102 travels as an ordinary signal and passes through without spatial reorientation. The resulting signals 101 and 102 both carry the full frequency spectrum of the WDM signal 500.

Both the horizontally and vertically polarized components 101 and 102 are coupled to a switchable polarization rotator 40 under control of a control bit. The polarization rotator 40 consists of two sub-element rotators that form a complementary state, i.e. when one turns on the other turns off. The rotator 40 selectively rotates the polarization state of either signal 101 or 102 by a predefined amount. In the preferred embodiment, the rotator 40 rotates the signals by either 0° (i.e., no rotation) or 90°. For example, the polarization rotator 40 can be a twisted nematic liquid crystal rotator, ferroelectric liquid crystal rotator, pi-cell based liquid crystal rotator, magneto-optic based Faraday rotator, acousto-optic or electro-optic based polarization rotator. Commercially available rotators based on liquid crystal technology are preferred, although other rotator technologies may be applied to meet the needs of a particular application. The switching speed of these elements ranges from a few milliseconds to nanoseconds, and therefore can be applied to a wide variety of systems to meet the needs of a particular application. These and similar basic elements are considered equivalents and may be substituted and interchanged without departing from the spirit of the present invention.

FIG. 2a illustrates the control state in which the signal 102 is rotated by 90° so that both signals 103, 104 exiting the rotator 40 have a horizontal polarization. FIG. 2b illustrates the second control state in which the polarization of the signal 101 is rotated by 90° so that both optical signals 103, 104 exiting the rotator 40 have a vertical polarization. Again, at this stage, both the horizontal and vertical components contain the entire frequency spectrum of channels in the WDM signal 500.

The stacked waveplates element 61 is a stacked plurality of birefringent waveplates at selected orientations that generate two eigen states. The first eigen state carries a first sub-spectrum with the same polarization as the input, and the second eigen state carries a complementary sub-spectrum at the orthogonal polarization. The polarization of the incoming beam and the two output polarizations form a pair of spectral responses, where (H, H) and (V, V) carry the first part of the input spectrum and (H, V) and (V, H) carry the complementary (second) part of the input spectrum, where V and H are vertical and horizontal polarization, respectively.

This may be better understood by comparing FIGS. 2a and 2b. With horizontal polarizations 103, 104 input to the staked waveplates element 61 as shown in FIG. 2a, orthogonal vertical and horizontal polarizations are generated with the first spectral band residing in horizontal polarization and the second spectral band residing in vertical polarization. With vertical polarizations 103, 104 input to the staked waveplates element 61 as shown in FIG. 2b, orthogonal vertical and horizontal polarizations are generated with the first spectral band residing in vertical polarization and the second spectral band residing in horizontal polarization.

For wavelength demultiplexing applications, the stacked waveplates element 61 has a comb filter response curve with a substantially flat top or square wave spectral response. For WDM optical channel add/drop applications, the stacked waveplates element 61 has an asymmetric filter response.

Returning to FIG. 2a, the pairs of optical responses 105, 106 output by the stacked waveplates element 61 are coupled to a second birefringent element 50. This birefringent element 50 has a similar construction to the first birefringent element 30 and spatially separates the horizontally and vertically polarized components of the input optical signals 105 and 106. As shown in FIG. 2a, the optical signals 105, 106 are broken into vertically polarized components 107, 108 containing the second spectral band and horizontally polarized components 109, 110 containing the first spectral band. Due to the birefringent walk-off effect, the two orthogonal polarizations that carry first spectral band 109, 110 in horizontal polarization and second set spectral band 107, 108 in vertical polarization are separated by the second birefringent element 50.

Following the second birefringent element 50, the optical elements on the input side of the second birefringent element 50 can be repeated in opposite order, as illustrated in FIGS. 2a and 2b. The second stacked waveplates element 62 has substantially the same composition as the first stacked waveplates element 61. The horizontally polarized beams 109, 110 input to the second stacked waveplates element 62, are further purified and maintain their polarization when they exit the second stacked waveplates element 62. On the other hand, the vertically polarized beams 107, 108 experience a 90° polarization rotation and are also purified when they exit the second stacked waveplates element 62. The 90° polarization rotation is due to the fact that the vertically polarized beams 107, 108 carry the second spectral band and therefore are in the complementary state of element 62. At the output of the stacked waveplates element 62, all four beams 111, 112 and 113, 114 have horizontal polarization. However, the spectral bands defined by the filter characteristics of the stacked waveplates elements 61, 62 are separated with the second spectral band 501 on top and the first spectral band 502 below.

To recombine the spectra of the two sets of beams 111, 112 and 113, 114, a second polarization rotator 41 and a second birefringent element 70 are used. Again, the second rotator 41 has two sub-elements that intercept the four parallel beams 111–114. The two sub-elements of the second rotator 41 are set at a complementary state to the first rotator 40, i.e. when the first rotator 40 is turned on/off, the second rotator 41 is turned off/on. In the case of FIG. 2a, the polarization of beams 111 and 113 is rotated by 90°, and beams 112 and 114 are passed without change of polarization. This results an orthogonal polarization pair 115, 116 and 117, 118 for each spectral band at the output of the second rotator 41. Finally, a second birefringent element 70 re-combines the two orthogonal polarizations 115, 116 and 117, 118 using the walk-off effect to produce two spectra that exit at ports 14 and 13, respectively. This completes the first operational state of the switchable wavelength router 999.

FIG. 2b shows the other control state in which the two polarization rotators 40 and 41 have switched to their complimentary states, i.e. from on to off, or off to on, in contrast to their states shown in FIG. 2a. The full spectrum 500 is first divided by polarization into two orthogonal states, i.e. vertical and horizontal polarization as indicated at 101 and 102, by the first birefringent element 30. The first polarization rotator 40 is now set to have the output polarizations 103 and 104 both vertical. After passing through the first stacked waveplates element 61, two orthogonal polarizations (i.e., horizontal and vertical) that carry second and first spectral bands are generated, respectively. In this state of operation, horizontal polarization is used to carry the second spectral band, and vertical polarization is used to carry the first spectral band of the WDM spectrum 500. The two spectral bands are then spatially separated by the second birefringent element 50 with vertical polarization 107, 108 going upward and horizontal polarization 109, 110 passing through without deviation. This, therefore, separates the two spectral bands according to their polarizations.

The resulting four beams 107–110 enter the second stacked waveplates element 62 for further spectral purification. Another important role of element 62 is its polarization rotation for the second spectral band. Remember that the stacked waveplates elements 61, 62 have two eigen states. With regard to the first band, the vertically polarized beams 107, 108 remain unchanged by element 62. However, with regard to the second spectral band, the horizontally polarized beams 109 and 110 are rotated by 90° as they pass through element 62 because they are in the complementary state of the stacked waveplate 62. At the output of element 62, all polarizations become vertical, as indicated by beams 111, 112 for the first spectral band and beams 113, 114 for the second spectral band in FIG. 2b. To recombine the two sub-spectra, a second polarization rotator 41 and third birefringent element 70 are used, as previously discussed. In the case of FIG. 2b, the second rotator 41 is set to rotate the polarizations of beams 112 and 114 by 90° and to pass beams 111 and 112 without rotation. The resulting beams 115–118 are recombined by the third birefringent element 70 and exit to ports 14 and 13 for the first and second spectral bands, respectively.

3. Single Stage Router

Figure 3A:
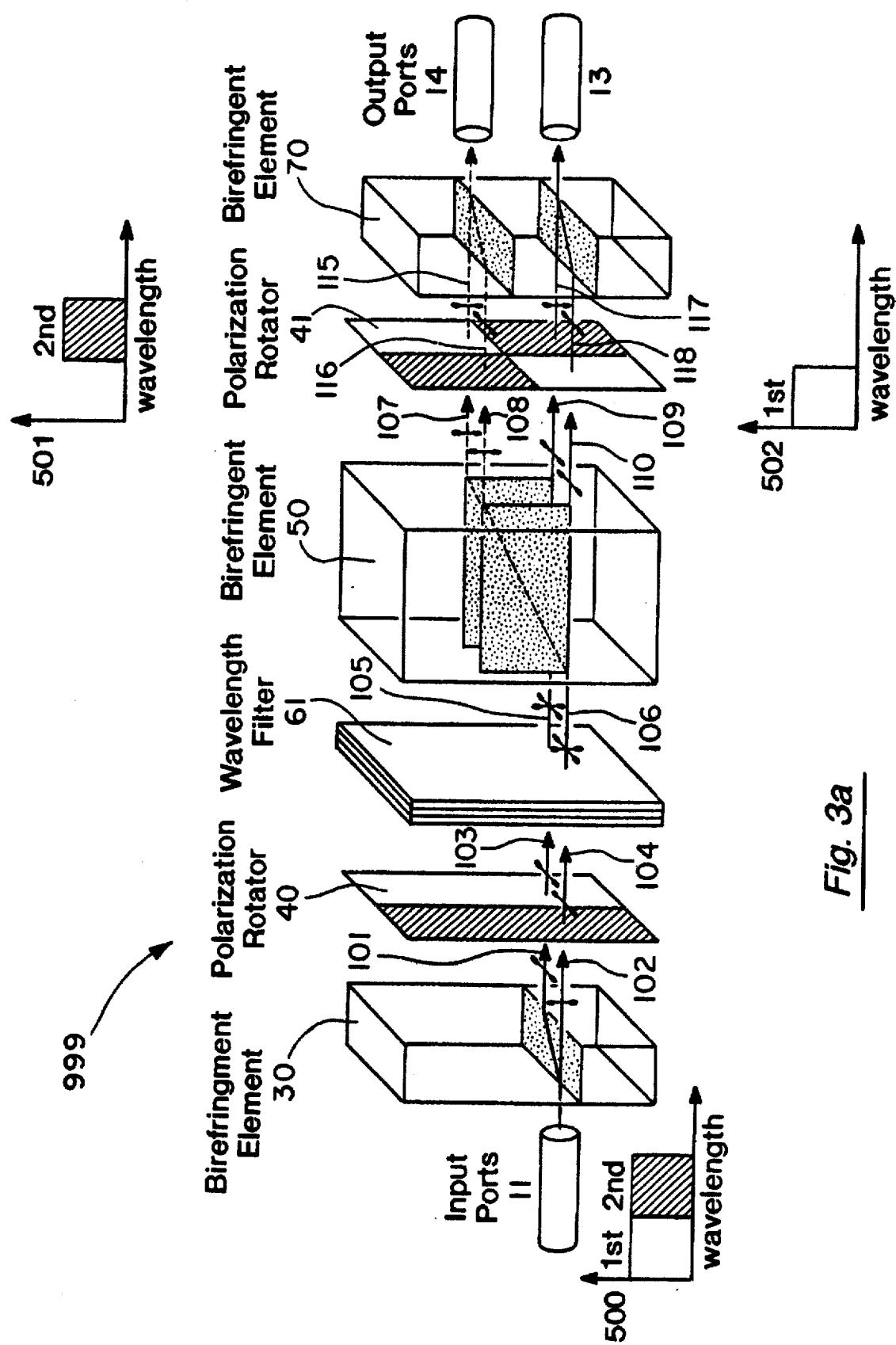
FIGS. 3a and 3b are simplified schematic diagrams illustrating a single stage switchable wavelength router in accordance with the present invention.
Figure 3B:
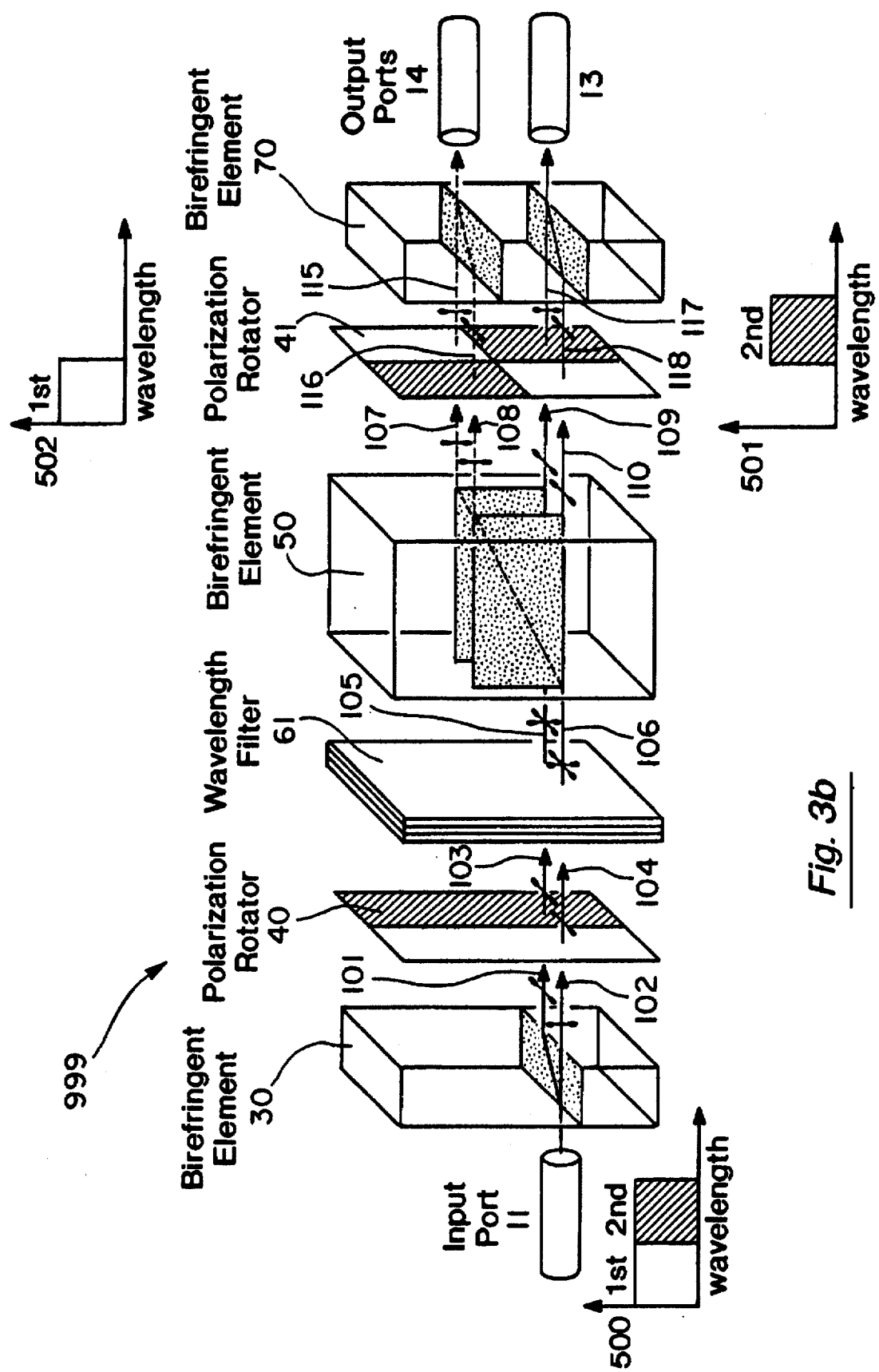

A simplified version of the double stage wavelength router using a single stage switchable wavelength router is shown in FIGS. 3a and 3b, for the two states of operation. Two changes have been made with this structure in contrast to the double stage design shown in FIGS. 2a and 2b. The second stacked waveplates element 62 in FIGS. 2a and 2b has been removed and the second polarization rotator 41 has been replaced with a passive polarization rotator with two sub-elements to intercept the beams 108 and 109, as shown in FIGS. 3a and 3b.

The single stage wavelength router operates in substantially the same manner as the double stage router until the beams 107–110 exit the second birefringent element 50. At the output of the second birefringent element 50, the divided first and second spectral bands are carried by two sets of orthogonally polarized beams 107, 108 and 109, 110, respectively. The positions of the first and second spectral bands depend on the polarization state of the beams 103 and 104. If the first spectral band is horizontally polarized by the first rotator 40, it will exit at the lower output port 13 and the second spectral band will exit at the upper output port 14. If the first spectral band is vertically polarized by the first rotator 40, it will exit at the upper output port 14 and the second spectral band will exit at the lower output port 13. Because of the birefringent walk-off effect in the second birefringent element 50, the vertically polarized light beams 107, 108 deviate from their original paths and travel upward, whereas the horizontally polarized beams 109, 110 pass through element 50 without changing their directions. The two pairs of beams 107, 108 and 109, 110 exiting the second birefringent element 50 have the same polarization but different frequencies.

The passive polarization rotator 41 is patterned to rotate polarization only in the areas that intercept beams 108 and 109. Therefore, at the output of the rotator 41, orthogonally polarized pairs of beams 115, 116 and 117, 118 are produced for both the first and second spectral bands. These beams 115–118 are then recombined by the third birefringent element 70 and exit to ports 13 and 14.

The single stage switchable wavelength router has the advantages of requiring fewer components as compared to the double stage router. However, its spectral purity is not as good as the double stage router. It will depend on the applications and requirements of a specific WDM network, whether the single stage or the double stage wavelength router is preferred.

One advantage of the present invention is that routing is accomplished while conserving substantially all optical energy available in the WDM signal 500. That is to say, regardless of the polarization of the signals in WDM signal 500 both the horizontal and vertically polarized components are used and recombined at output ports 13, 14 resulting in very low loss through router 999.

Each set of birefringent waveplates 61, 62 is oriented at an unique optic axis angle with respect to the optical axis of polarization rotator 40. As mentioned earlier, the spectral design for the stacked waveplates elements 61 and 62 is dependent on the applications required by the WDM network. In the following, we list three different designs that can be used with current WDM systems. The first example uses stacked waveplates with equally separated sub-spectra centered at 1533 and 1557 nm wavelength. In the second case, asymmetric sub-spectra are produced by the stacked waveplates. This design can be used for an add/drop optical filter application. The third one is designed to cover the two transmission windows of fiber optics networks at 1310 and 1550 nm wavelengths. In this case, the center wavelengths of 1310 and 1550 nm can be interchangeably routed to either output port.

EXAMPLE 1

Figure 4A:
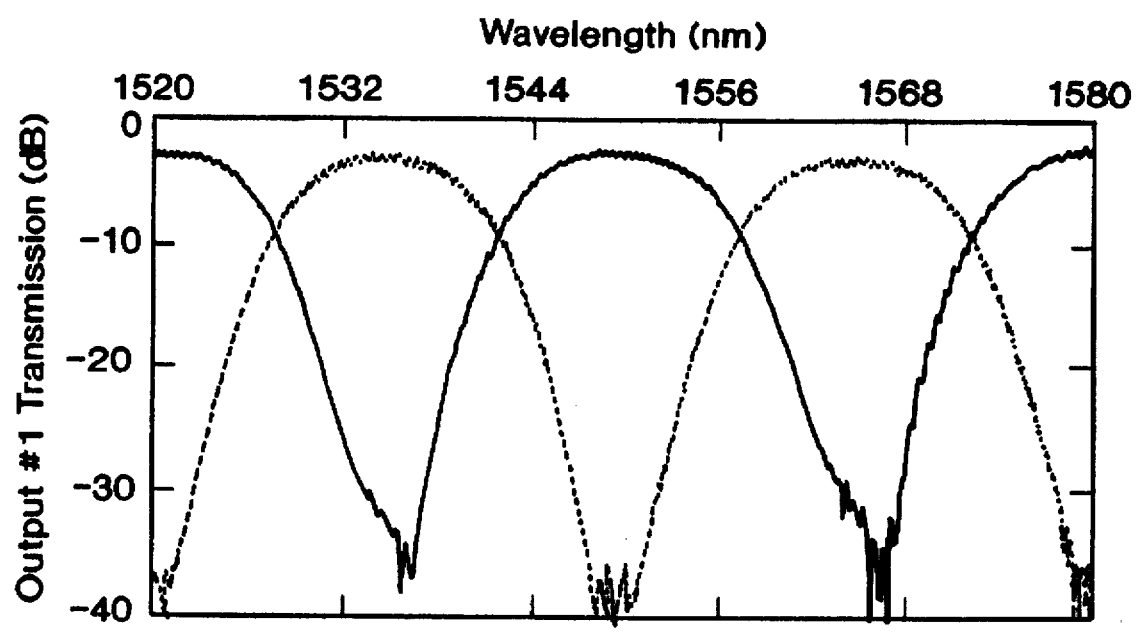
FIGS. 4a and 4b are graphs showing experimental results using three lithium niobate waveplates in the filter design.
Figure 4B:
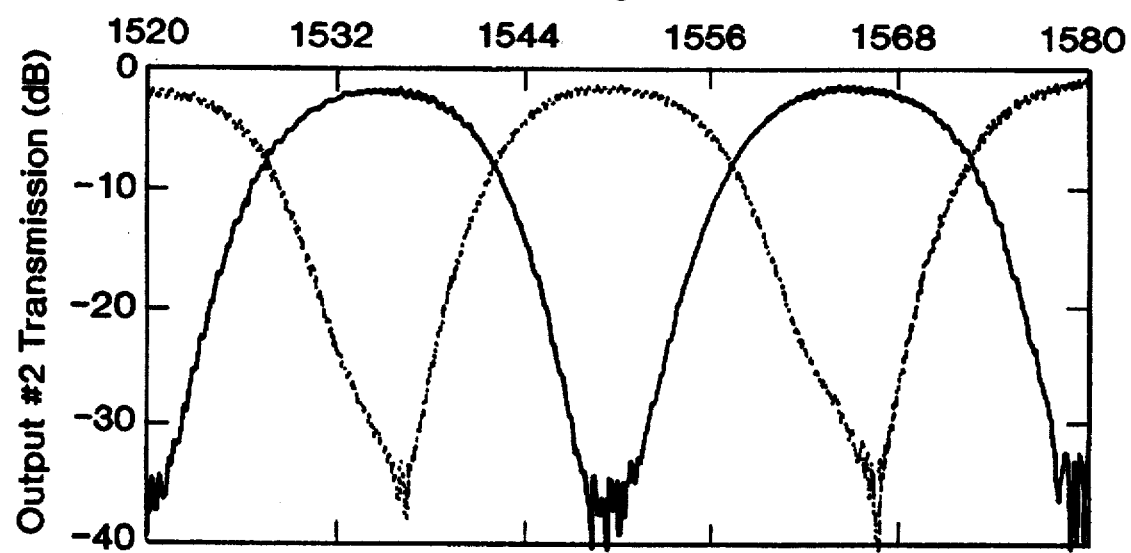

Three lithium niobate ($LiNbO_3$) waveplates having a thickness of 1 mm have been stacked together to form a flat-top, equally divided spectrum, as shown in FIG. 4, with channel crosstalk under 30 dB. The experimental results are based on the double stage switchable wavelength router. This out-performs existing filter technologies, such as using multi-layer dielectric coatings, where a 20 dB crosstalk is generally obtained. Because of the equal spectra design at the two output ports, this type of switchable wavelength router can be further cascaded. With "n" stages of routers cascaded, a total of $2^n$ output ports result. These $2^n$ ports can have their output spectra permuted according to n control signals to create a programmable wavelength router.

EXAMPLE 2

Figure 5:
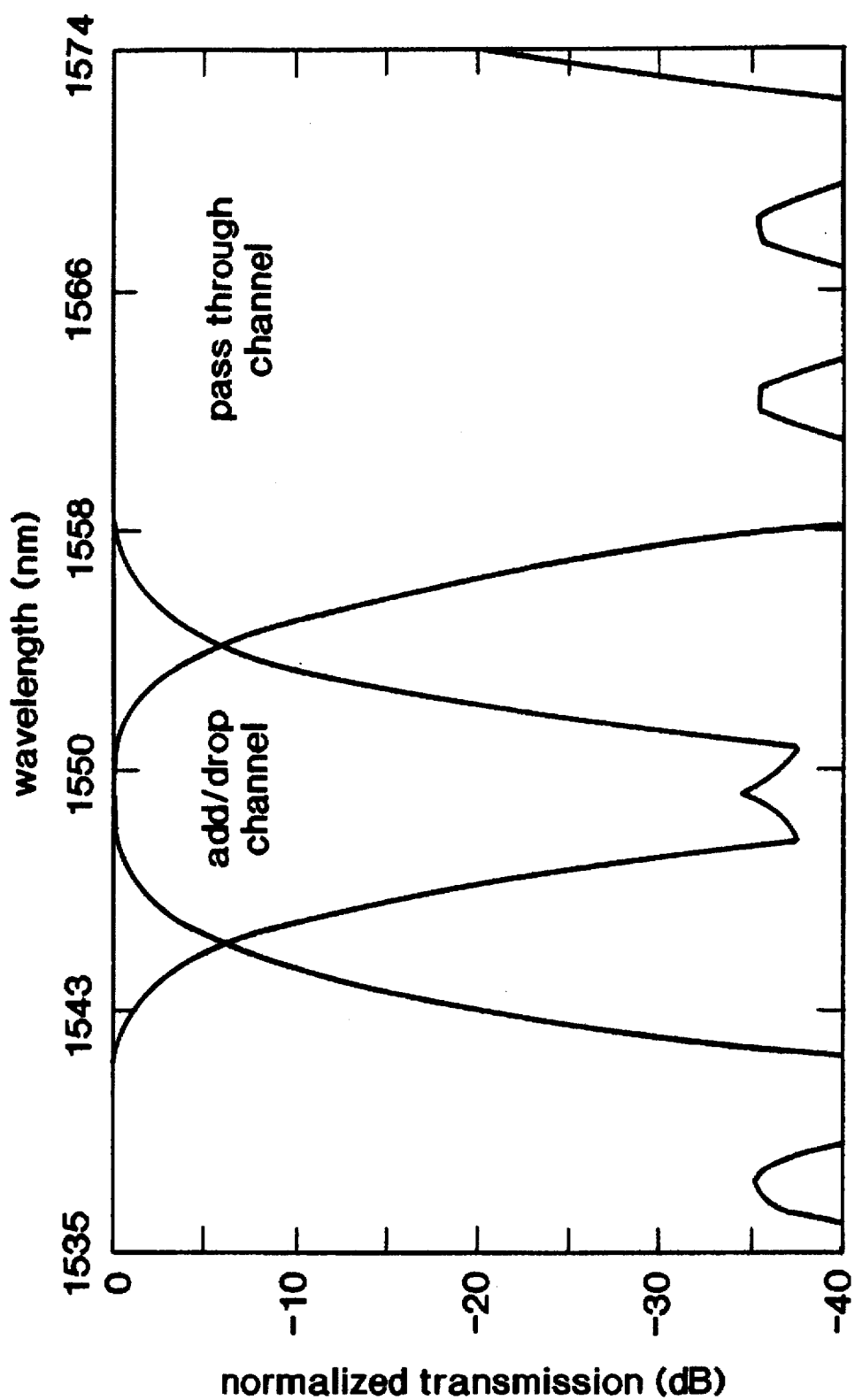
FIG. 5 is a graph showing a design of asymmetric spectra where the narrower one can be used as an add/drop port, whereas the wider spectrum can pass the rest of WDM signals back to the network.

FIG. 5 shows an asymmetric spectrum design, where one output port carries a much narrower spectral width compared to the other port. This design can be applied to a WDM network when there is a need to add or drop part of the optical channels at an optical exchange node. The add/drop filter can be either passive or active, depending on system design and requirements. The switching element, i.e. the switchable polarization rotator arrays, can be replaced by two passive halfwave plates at each corresponding position of the polarization rotator, such that one of the ports is always designated as the add/drop port. The rest of the optical channels pass through the wavelength router and continue to propagate along the WDM network.

EXAMPLE 3

Figure 6:
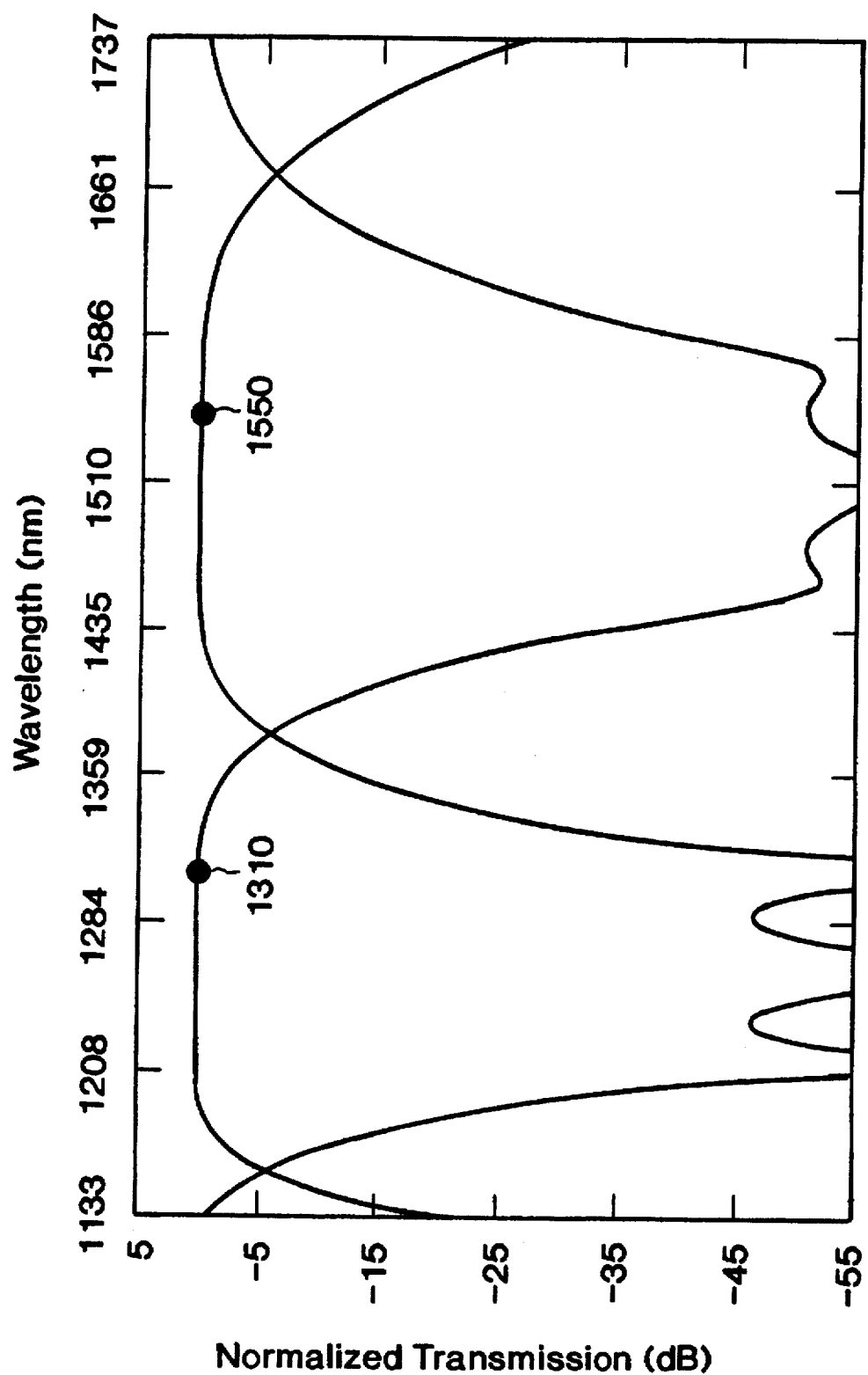
FIG. 6 is a graph showing a design of a switchable wavelength router to cover the 1310 and 1550 nm wavelengths. A better than −50 dB crosstalk between both channels is obtained with this design.

As shown in FIG. 6, the present invention can be further extended to farther apart spectra to cover two operational wavelength windows centered at 1310 and 1550 nm for fiber optic communications. Several techniques (e.g., fiber fusion and multi-layer coating techniques) have been widely used in the industry to perform this task. However, the current design provides lower crosstalk and a switchable characteristic, which are valuable from the system's point of view.

The above disclosure sets forth a number of embodiments of the present invention. Other arrangements or embodiments, not precisely set forth, could be practiced under the teachings of the present invention and as set forth in the following claims.

We claim:

1. A method for switching wavelength division multiplexed (WDM) optical signals comprising the steps of:
   providing a first input/output (I/O) port for receiving the WDM optical signal;
   providing a second I/O port;
   providing a third I/O port;
   spatially decomposing the WDM optical signal received from said first I/O port into first and second beams having orthogonal polarizations with respect to each other;
   rotating the polarization of said first beam to substantially match the polarization of said second beam;
   demultiplexing said first and second beams of same polarization through a first wavelength filter having a polarization dependent optical transmission function such that said first beam decomposes into third and fourth beams with their polarizations orthogonal to each other, and said second beam decomposes into fifth and sixth beams with their polarizations orthogonal to each other, wherein said third and fifth beams carry a first predetermined spectral band at a first polarization and said fourth and sixth beams carry a second predetermined spectral band at a second polarization, wherein said first and second spectral bands are substantially complementary and said first and second polarizations are orthogonal;
   spatially routing said third, fourth, fifth and sixth beams based upon their polarizations;
   passing said routed third, fourth, fifth and sixth beams through a second wavelength filter having substantially the same transmission function as said first wavelength filter, wherein second wavelength filter rotates said third, fourth, fifth, and sixth beams back to the same polarization state as said second beam before it enters said first wavelength filter;
   rotating the polarizations of said fifth and sixth beams such that they are orthogonal to said third and fourth beams;
   spatially recombining said third and fifth beams containing said first spectral band, and spatially recombining the said fourth and sixth beams containing said second spectral band; and
   coupling said first spectral band to said second I/O port and said second spectral band to said third I/O port.

2. The method of claim 1 wherein the step of spatially decomposing the WDM optical signal uses a first birefringent element.

3. The method of claim 1 wherein the step of routing said third, fourth, fifth, and sixth beams uses a second birefringent element.

4. The method of claim 1 wherein the step of recombining said third, fourth, fifth, and sixth beams uses a third birefringent element.

5. The method of claim 1 wherein the step of rotating the first beam further comprises passing said first and second beams through a configurable rotator array having:
   (a) a first area for rotating the polarization of said first beam; and
   (b) a second area for passing said second beam.

6. The method of claim 1 wherein the step of rotating the polarization of said fifth and sixth beams comprises passing said third, fourth, fifth and sixth beams through a configurable rotator array having:
   (a) a first area for rotating the polarization of said fifth and sixth beams; and (b) a second area for passing said third and fourth beams.

7. The method of claim 1 wherein said first wavelength filter comprises a stacked plurality of birefringent waveplates with each waveplate oriented in a predetermined direction.

8. The method of claim 1 wherein said second wavelength filter comprises a stacked plurality of birefringent waveplates with each waveplate oriented in a predetermined direction.

9. A method for switching wavelength division multiplexed (WDM) optical signals comprising the steps of:
  providing a first input/output I/O) port for receiving the WDM optical signal;
  providing a second I/O port;
  providing a third I/O port;
  spatially decomposing the WDM optical signal received from said first I/O port into first and second beams having orthogonal polarizations with respect to each other;
  rotating the polarization of said first beam to substantially match the polarization of said second beam;
  demultiplexing said first and second beams of same polarization through a wavelength filter having a polarization dependent optical transmission function such that said first beam decomposes into third and fourth beams with their polarizations orthogonal to each other, and said second beam decomposes into fifth and sixth beams with their polarizations orthogonal to each other, wherein said third and fifth beams carry a first predetermined spectral band at a first polarization and said fourth and sixth beams carry a second predetermined spectral band at a second polarization, wherein said first and second spectral bands are substantially complementary and said first and second polarizations are orthogonal;
  spatially routing said third, fourth, fifth, and sixth beams based upon their polarizations;
  rotating the polarizations of said third, fourth, fifth, and sixth beams such that said third and fifth beams are orthogonally polarized and said fourth and sixth beams are orthogonally polarized;
  spatially recombining said third and fifth beams containing said first spectral band, and spatially recombining the said fourth and sixth beams containing said second spectral band; and
  coupling said first spectral band to said second I/O port and said second spectral band to said third I/O port.

10. The method of claim 9 wherein the step of spatially decomposing the WDM optical signal uses a first birefringent element.

11. The method of claim 9 wherein the step of routing said third, fourth, fifth, and sixth beams uses a second birefringent element.

12. The method of claim 9 wherein the step of recombining said third, fourth, fifth, and sixth beams uses a third birefringent element.

13. The method of claim 9 said wavelength filter comprises a stacked plurality of birefringent waveplates with each waveplate oriented in a predetermined direction.

14. The method of claim 9 wherein the step of rotating the first beam further comprises passing said first and second beams through a configurable rotator array having:

(a) a first area for rotating the polarization of said first beam; and (b) a second area for passing said second beam.

15. The method of claim 9 wherein the step of rotating the polarization of said fifth and sixth beams comprises passing said third, fourth, fifth and sixth beams through a configurable rotator array having:
  (a) a first area for rotating the polarization of said fifth beams;
  (b) a second area for rotating the polarization of said sixth beam;
  (c) a third are for passing said third beam without rotation; and
  (b) a fourth area for passing said fourth beam without rotation.

16. A switchable wavelength router comprising:
  a first birefringent element for receiving an WDM optical signal and decomposing said WDM optical signal into a first beam and a second beam that have orthogonal polarizations and are spatially separated;
  a first polarization rotator having a first control state in which the polarization of said first beam is rotated to substantially match the polarization of said second beam, and a second control state in which the polarization of said second beam is rotated to substantially match the polarization of said first beam; the control state of said first polarization rotator being switchable by an external control signal;
  a wavelength filter coupled to receive said first and second beams from said first polarization rotator, said wavelength filter having a polarization dependent optical transmission function such that the said first beam decomposes into third and fourth beams with their polarizations orthogonal to each other, and said second beam decomposes into fifth and sixth beams with their polarizations orthogonal to each other, wherein said third and fifth beams carry a first predetermined spectral band at a first polarization and said fourth and sixth beams carry a second predetermined spectral band at a second polarization, wherein said first and second spectral bands are substantially complementary and said first and second polarizations are orthogonal;
  a second birefringent element for spatially separating said third, fourth, fifth, and sixth beams into four horizontally polarized and vertically polarized components;
  a second polarization rotator for rotating the polarizations of said third, fourth, fifth, and sixth beams such that said third and fifth beams are orthogonally polarized and said fourth and sixth beams are orthogonally polarized; and
  a third birefringent element for receiving said third, fourth, fifth, and sixth beams from said second polarization rotator, spatially recombining said third and fifth beams containing said first spectral band, and spatially recombining said fourth and sixth beams containing said second spectral band.

17. The router of claim 16 wherein said first polarization rotator further comprises:
  a first area for rotating the polarization of said first beam in said first control state, and passing said first beam without rotation in said second control state; and a second area for passing said second beam without rotation in said first control state, and rotating the polarization of said second beam in said second control state.

18. The router of claim 16 wherein said second polarization rotator further comprises:

(a) a first area for rotating the polarization of said fifth beam;

(b) a second area for rotating the polarization of said sixth beam;

(c) a third are for passing said third beam without rotation; and (b) a fourth area for passing said fourth beam without rotation.

19. The router of claim 16 wherein said wavelength filter comprises a stacked plurality of birefringent waveplates with each waveplate oriented in a predetermined direction.

* * * * *

UNITED STATES PATENT AND TRADEMARK OFFICE
CERTIFICATE OF CORRECTION

PATENT NO.   : 5,694,233
DATED        : December 2, 1997
INVENTOR(S)  : Kuang-Yi Wu and Jian-Yu Liu It is certified that error appears in the above-indentified patent and that said Letters Patent is hereby corrected as shown below:

Column 1, line 2, please insert heading, "Government Interests"

As a separate paragraph, after the heading, please insert the following, "The invention was made with Government support under Contract DARPA 1: DAAH01-96-C-R263 awarded by U.S. Army Missile Command, AMSMI-AC-CRAY, Redstone Arsenal, AL 35898. The Government has certain rights in the invention."

Signed and Sealed this

Eleventh Day of April, 2000

Q. TODD DICKINSON

*Attest:*

*Attesting Officer*              *Director of Patents and Trademarks*